(12) United States Patent
Sarikaya

(10) Patent No.: US 8,599,843 B2
(45) Date of Patent: Dec. 3, 2013

(54) APPARATUS AND METHOD FOR ROUTE OPTIMIZATION FOR PROXY MOBILE INTERNET PROTOCOL VERSION SIX LOCAL ROUTING

(75) Inventor: Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 268 days.

(21) Appl. No.: 12/711,630

(22) Filed: Feb. 24, 2010

(65) Prior Publication Data

US 2010/0220738 A1   Sep. 2, 2010

Related U.S. Application Data

(60) Provisional application No. 61/156,609, filed on Mar. 2, 2009.

(51) Int. Cl.
*H04W 4/00* (2009.01)
*H04L 12/28* (2006.01)
*H04W 36/00* (2009.01)
*G06F 15/16* (2006.01)

(52) U.S. Cl.
USPC ........... 370/389; 370/401; 370/331; 370/338; 370/328; 709/245; 455/436

(58) Field of Classification Search
None
See application file for complete search history.

(56) References Cited

U.S. PATENT DOCUMENTS

| | | | |
|---|---|---|---|
| 6,792,423 B1 * | 9/2004 | Jeffries et al. .......................... | 1/1 |
| 7,085,306 B1 * | 8/2006 | Voldman et al. .............. | 375/132 |
| 7,809,139 B2 * | 10/2010 | Choi et al. .................... | 380/210 |
| 7,929,556 B2 * | 4/2011 | Melia et al. .................... | 370/401 |
| 8,040,845 B2 * | 10/2011 | Oulai et al. .................... | 370/329 |
| 8,064,910 B2 * | 11/2011 | Lee ................................. | 455/436 |
| 8,085,793 B2 * | 12/2011 | Krishnan et al. .............. | 370/400 |

(Continued)

FOREIGN PATENT DOCUMENTS

| | | |
|---|---|---|
| CN | 1870819 A | 11/2006 |
| CN | 101321384 A | 12/2008 |

(Continued)

OTHER PUBLICATIONS

Sarikaya, B. "Simplified Route Optimization for PMIPv6 Local Routing," draft-sarikaya-netext-simplero-01.txt; Jun. 2009.

(Continued)

*Primary Examiner* — Hassan Phillips
*Assistant Examiner* — Hicham Foud
(74) *Attorney, Agent, or Firm* — Conley Rose, P.C.; Grant Rodolph; Brandt D. Howell

(57) ABSTRACT

Disclosed herein is a route optimization that allows packets flowing between a mobile node (MN) and a correspondent node (CN) to bypass local mobility anchors (LMAs), thereby improving flow efficiency and/or reducing network traffic. Specifically, the MN's mobile access gateway (MAG) and the CN's MAG may participate in a proxy binding update (PBU)/proxy binding acknowledgement (PBA) exchange with each other to establish the MN's and CN's state in the opposing MAG. After doing so, the two MAGs may send MN-CN packets directly to each other, e.g. without sending such packets to the LMAs. In one embodiment, the route optimization is applied to a situation where the MN's MAG and the CN's MAG are associated with the same LMA. In another embodiment, the route optimization is applied to a situation where the MN's MAG and the CN's MAG are associated with different LMAs.

23 Claims, 7 Drawing Sheets

(56) References Cited

U.S. PATENT DOCUMENTS

| | | | |
|---|---|---|---|
| 2005/0232146 A1* | 10/2005 | Lee et al. | 370/225 |
| 2006/0171370 A1 | 8/2006 | Matsumoto et al. | |
| 2007/0195791 A1* | 8/2007 | Bosch et al. | 370/395.52 |
| 2008/0137591 A1 | 6/2008 | Hirano et al. | |
| 2008/0192695 A1* | 8/2008 | Krishnan et al. | 370/331 |
| 2008/0316974 A1* | 12/2008 | Krishnan et al. | 370/331 |
| 2009/0016364 A1* | 1/2009 | Krishnan | 370/401 |
| 2009/0073935 A1* | 3/2009 | Xia et al. | 370/331 |
| 2009/0106385 A1* | 4/2009 | Sarikaya et al. | 709/207 |
| 2009/0122750 A1* | 5/2009 | Sarikaya | 370/328 |
| 2009/0310564 A1* | 12/2009 | Kim et al. | 370/331 |
| 2010/0067446 A1* | 3/2010 | Oulai et al. | 370/329 |
| 2010/0174828 A1* | 7/2010 | Jeong et al. | 709/224 |
| 2010/0208706 A1* | 8/2010 | Hirano et al. | 370/332 |
| 2010/0214982 A1* | 8/2010 | Hirano et al. | 370/328 |
| 2010/0268804 A1* | 10/2010 | Aso et al. | 709/222 |
| 2010/0315973 A1* | 12/2010 | Hirano et al. | 370/254 |
| 2010/0315992 A1* | 12/2010 | Turanyi | 370/315 |
| 2011/0103304 A1* | 5/2011 | Jeon et al. | 370/328 |
| 2011/0122824 A1* | 5/2011 | Muhanna et al. | 370/328 |

FOREIGN PATENT DOCUMENTS

| | | | |
|---|---|---|---|
| JP | 2008541516 A | 11/2008 | |
| KR | 20060036041 A | 4/2006 | |
| KR | 20070093979 A | 9/2007 | |
| WO | 2008104132 A1 | 9/2008 | |
| WO | 2009002075 A2 | 12/2008 | |
| WO | WO 2009002075 A2 * | 12/2008 | H04W 8/08 |
| WO | WO 2009097914 A1 * | 8/2009 | H04W 8/08 |

OTHER PUBLICATIONS

Sarikaya, B. "Simplified Route Optimization for PMIPv6 Local Routing," draft-sarikaya-netext-simplero-00.txt; Mar. 2009.

Wakikawa, R., et al., "IPv4 Support for Proxy Mobile IPv6," draft-ietf-netlmm-pmip6-ipv4-support-12, Apr. 2009.

Bradner, S., "Key Words for Use in RFCs to Indicate Requirement Levels," BCP 14, RFC 2119, Mar. 1997.

Johnson, D., et al., "Mobility Support in IPv6," RFC 3775, Jun. 2004.

Aura, T., "Cryptographically Generated Addresses (CGA)," RFC 3972, Mar. 2005.

Arkko, J., et al., "Enhanced Route Optimization for Mobile IPv6," RFC 4866, May 2007.

Gundavelli, S., et al., "Proxy Mobile IPv6," RFC 5213, Aug. 2008.

Soliman, H., "Mobile IPv6 Support for Dual Stack Hosts and Routers (DSMIPv6)," draft-ietf-mip6-nemo-v4traversal-06, Nov. 2007.

Liebsch, M., "PMIPv6 Localized Routing Problem Statement," draft-liebsch-netext-pmip6-ro-ps-00, Feb. 2009.

Perkins, C., "Securing Mobile IPv6 Route Optimization Using a Static Shared Key," RFC 4449, Jun. 2006.

Wakikawa, R., et al., "IPv4 Support for Proxy Mobile IPv6," draft-ietf-netlmm-pmip6-ipv4-support-09, Jan. 2009.

Wakikawa, R., et al., "IPv4 Support for Proxy Mobile IPv6," draft-ietf-netlmm-pmip6-ipv4-support-18, Feb. 12, 2010.

Liebsch, M., "PMIPv6 Localized Routing Problem Statement," draft-liebsch-netext-pmip6-ro-ps-01, Jul. 13, 2009.

Liebsch, M., et al., "PMIPv6 Localized Routing Problem Statement," draft-ietf-netext-pmip6-lr-ps-00.txt, Sep. 21, 2009, 17 pages.

Liebsch, M., et al., "PMIPv6 Localized Routing Problem Statement," draft-ietf-netext-pmip6-lr-ps-02.txt, Jan. 22, 2010, 18 pages.

Muhanna, A., et al., "GRE Key Option for Proxy Mobile IPv6," draft-ietf-netlmm-grekey-option-06.txt, Feb. 24, 2009, 25 pages.

Muhanna, A., et al., "GRE Key Option for Proxy Mobile IPv6," draft-ietf-netlmm-grekey-option-09.txt, May 6, 2009, 25 pages.

Johnson, D., et al., "Mobility Support in IPv6," draft-ietf-mext-rfc3775bis-02.txt, Oct. 1, 2008, 175 pages.

Johnson, D., et al., "Mobility Support in IPv6," draft-ietf-mext-rfc3775bis-05.txt, Oct. 19, 2009, 175 pages.

Wu, Q., et al., "Proxy MIP Extension for Local Routing Optimization," draft-wu-netext-local-ro-00.txt, Mar. 4, 2009, 18 pages.

Foreign Communication From a Related Counterpart Application, European Application 10748317.4, Extended European Search Report dated Oct. 27, 2011, 16 pages.

Foreign Communication From a Related Counterpart Application, PCT Application PCT/CN2010/070794, International Search Report dated Jun. 3, 2010, 4 pages.

Foreign Communication From a Related Counterpart Application, PCT Application PCT/CN2010/070794, Written Opinion dated Jun. 3, 2010, 8 pages.

Vogt, C., et al., "Security Threats to Network-Based Localized Mobility Management (NETLMM)," Network Working Group, RFC 4832, Apr. 2007, 12 pages.

Foreign Communication From a Related Counterpart Application, Korean Application No. 10-2011-7022110, Korean Office Action dated Aug. 30, 2012, 6 pages.

Foreign Communication From a Related Counterpart Application, Korean Application No. 10-2011-7022110, Translation of Korean Office Action dated Aug. 30, 2012, 2 pages.

Foreign Communication From a Counterpart Application, Japanese Application 1020117022110, Notice of Allowance dated Jan. 30, 2013, 2 pages.

Foreign Communication From a Counterpart Application, Japanese Application 1020117022110, Partial Translation of Notice of Allowance dated Jan. 30, 2013, 1 page.

Foreign Communication From a Counterpart Application, Japanese Application 2011552312, Japanese Office Action dated Feb. 5, 2013, 3 pages.

Foreign Communication From a Counterpart Application, Chinese Application 201080008918.0, Chinese Office Action dated Apr. 1, 2013, 5 pages.

Foreign Communication From a Counterpart Application, Chinese Application 201080008918.0, Partial English Translation of Chinese Office Action dated Apr. 1, 2013, 4 pages.

Foreign Communication From a Counterpart Application, Korean Application 1020117022110, Notice of Allowance dated Jan. 30, 2013, 2 pages.

Foreign Communication From a Counterpart Application, Korean Application 1020117022110, Partial Translation of Notice of Allowance dated Jan. 30, 2013, 1 page.

Foreign Communication From a Counterpart Application, Japanese Application No. 2011-552312, Japanese Office Action dated Jul. 2, 2013, 4 pages.

Foreign Communication From a Counterpart Application, Japanese Application No. 2011-552312, English Translation of Japanese Office Action dated Jul. 2, 2013, 4 pages.

Gundavelli, S., "Proxy Mobile IPv6," draft-sgundave-mip6-proxymip6-01.txt, Jan. 5, 2007, 39 pages.

Foreign Communication From a Counterpart Application, European Application No. 10748317.4, European Office Action dated Aug. 19, 2013, 9 pages.

* cited by examiner

APPARATUS AND METHOD FOR ROUTE OPTIMIZATION FOR PROXY MOBILE INTERNET PROTOCOL VERSION SIX LOCAL ROUTING

CROSS-REFERENCE TO RELATED APPLICATIONS

The present application claims priority to U.S. Provisional Patent Application No. 61/156,609 filed Mar. 2, 2009 by Behcet Sarikaya and entitled "Simplified Route Optimization for PMIPv6 Local Routing," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies. Generally, a mobile node (MN) has to perform some reconfiguration of its mobility parameters when it moves from one access node to another access node. Proxy mobile IPv6 (PMIPv6) is a protocol that allows the MN to avoid handling its own mobility management. Specifically, the MN's mobility management is handled by a mobile access gateway (MAG) and/or local mobility anchor (LMA) without any participation by the MN. When a MN and a correspondent node (CN) in the same localized network mobility domain communicate using PMIPv6, the MN-CN communications are routed from the MN, to the MN's MAG, to the MN's LMA, to the CN's LMA, to the CN's MAG, and then to the CN. CN to MN communications are routed along the same path in the opposite direction. In some circumstances, this MN-CN communications path leads to sub-optimal packet routing between the MN and CN.

SUMMARY

In one embodiment, the disclosure includes an apparatus comprising a first MAG associated with a MN and configured to send a proxy binding update (PBU) to a second MAG associated with a CN.

In another embodiment, the disclosure includes an apparatus comprising at least one processor configured to implement a method comprising promoting transmission of a route optimization start request (ROStartReq) message to a MAG, wherein the ROStartReq message requests route optimization between a MN and a CN, and wherein the ROStartReq message comprises a MN-CN route optimization (RO) option.

In yet another embodiment, the disclosure includes a system comprising a LMA, a first MAG coupled to the LMA and in communication with a MN, and a second MAG coupled to the LMA and in communication with a CN, wherein communications between the MN and the CN are routed through the first MAG and the second MAG without being routed through the LMA.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a route optimization that allows packets flowing between the MN and the CN to bypass the LMAs, thereby improving flow efficiency and/or reducing network traffic. Specifically, the MN's MAG and the CN's MAG may participate in a proxy binding update (PBU)/proxy binding acknowledgement (PBA) exchange with each other to establish the MN's and CN's state in the opposing MAG. After doing so, the two MAGs may send MN-CN packets directly to each other, e.g. without sending such packets to the LMAs. In one embodiment, the route optimization is applied to a situation where the MN's MAG and the CN's MAG are associated with the same LMA. In another embodiment, the route optimization is applied to a situation where the MN's MAG and the CN's MAG are associated with different LMAs. Route optimization request and response messages comprising route optimization options are provided for both embodiments. Handover and IPv4 support for the route optimization are also provided.

Figure 1:
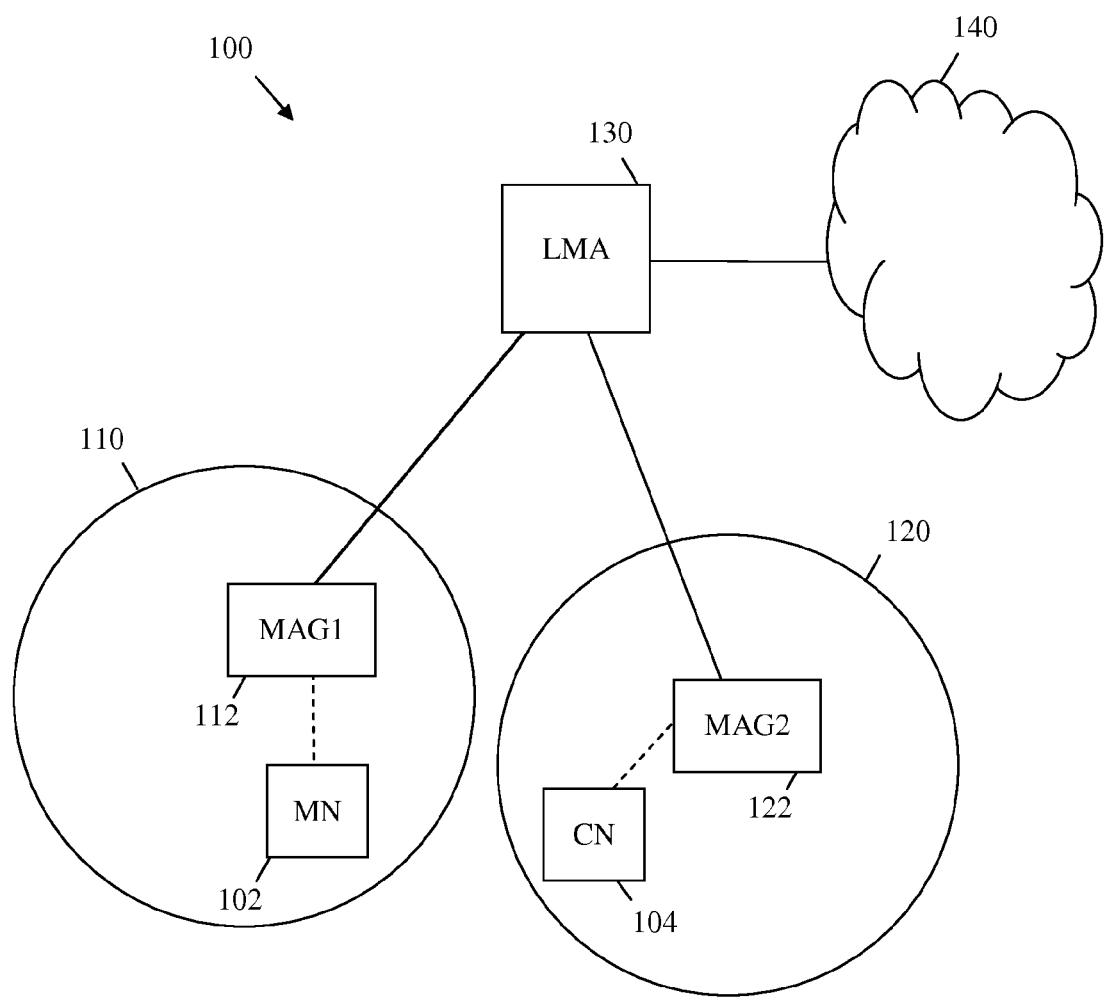
FIG. 1 is a schematic diagram of one embodiment of a wireless access network system.

FIG. 1 illustrates an embodiment of a wireless access network system 100, which may support route optimization in PMIPv6. The wireless access network system 100 may comprise a MN 102, a CN 104, a first MAG 112 (MAG1) in a first wireless access network 110, a second MAG 122 (MAG2) in a second access network 120, a LMA 130, and a network 140. The MN 102 may be located within the first wireless access network 110 coverage area, and as such the MN 102 may communicate with the first MAG 112 via a wireless connection. Similarly, the CN 104 may be located within the second access network 120 coverage area, and as such the CN 104 may communicate with the second MAG 122 via a wireless or wired connection. In addition, the first MAG 112 and the second MAG 122 may independently establish connections and communicate with the LMA 130. Such a configuration allows the MN 102 and the CN 104 to communicate with each other and the network 140.

In an embodiment, the MN 102 may be any mobile device that uses the first wireless access network 110 to communicate with the CN 104 and/or the network 140. Specifically, the MN 102 may be a mobile user-oriented device that communicates with the CN 104 and/or the network 140 via first MAG 112, the second MAG 122, and/or the LMA 130. For example, the MN 102 may be a cellular telephone, a notebook computer, a personal digital assistant (PDA), or any other wireless device. Alternatively, the MN 102 may be a fixed communications device, such as a desktop computer or set top box, which may be connected to the first MAG 112 using wireless technology. In addition, the MN 102 may be an IP host or router whose mobility is managed by the wireless access network system 100. Specifically, the MN 102 may be an IPv4-only node, IPv6-only node, or a dual-stack node, and may not be required to participate in any IP mobility related signaling for achieving mobility for an IP address that is obtained in that PMIPv6 domain.

In an embodiment, the CN 104 may be any device that uses the second access network 120 to communicate with the MN 102 and/or the network 140. Specifically, the CN 104 may be a device that communicates with the MN 102 and/or the network 140 via first MAG 112, the second MAG 122, and/or the LMA 130. For example, the CN 104 may be a mobile communications device, such as a cellular telephone, a notebook computer, a PDA, or any other wireless device. Alternatively, the CN 104 may be a fixed communications device, such as a desktop computer, a server, a set top box, or any other fixed communication device. The CN 104 may be connected to the first MAG 112, the second MAG 122, and/or the LMA 130 using wireless or wired (e.g. optical or electrical) technology. In addition, the CN 104 may be an IP host or router whose mobility is managed by the wireless access network system 100. Specifically, the CN 104 may be an IPv4-only node, IPv6-only node, or a dual-stack node, and may not be required to participate in any IP mobility related signaling for achieving mobility for an IP address that is obtained in that PMIPv6 domain.

In an embodiment, the first MAG 112 and the second MAG 122 may be any devices or components configured to handle mobility management for the MN 102, e.g. based on the PMIPv6 protocol. PMIPv6 is described in the Internet Engineering Task Force (IETF) Request for Comments (RFC) 5213, which is incorporated herein by reference as if reproduced in its entirety. For example, the first MAG 112 and the second MAG 122 may be access routers or access gateways that provide access between the MN 102, the CN 104, and/or the network 140. In an embodiment, the first MAG 112 and the second MAG 122 may manage the mobility-related signaling for any MNs 102 and/or CNs 104 that are attached to their access links. The first MAG 112 and the second MAG 122 may be responsible for tracking the MN's movements to and from the access link and for signaling such to the LMA 130. In an embodiment, the first MAG 112 and the second MAG 122 may maintain a Binding Update List (BUL), which may be a data structure that keeps correspondent registrations for other MAGs. Additionally or alternatively, the first MAG 112 and the second MAG 122 may maintain a Binding Cache, which may be a cache of mobility bindings for the MNs 102 that may be used for sending or forwarding messages to other MAGs serving the MNs. In a specific embodiment, the first MAG 112 and the second MAG 122 may exchange PBU and PBA messages with each other to redirect flows between the MN 102 and the CN 104, as described below.

In an embodiment, the LMA 130 may be any device or component that provides connectivity and/or external access to the MN 102 via the first MAG 112 and/or to the CN 104 via the second MAG 122. The LMA 130 may be configured to support the PMIPv6 protocol, and may be the home agent (HA) for the MN 102 in a PMIPv6 domain. Specifically, the LMA 130 may be the topological anchor point for the MN's home network prefix(es), and may be the entity that manages the MN's binding state. The LMA 130 may have the functional capabilities of a HA as defined in IETF document RFC 3775, which is incorporated herein by reference, and may have additional capabilities required for supporting PMIPv6 as defined in RFC 5213. In a specific embodiment, the first MAG 112 and the second MAG 122 may exchange ROStartReq and ROStartReq messages with the first MAG 112 and the second MAG 122, as described below.

The network 140 may be any network that provides services to the MN 102 via the first wireless access network 110 and/or the CN 104 via the second access network 120. For instance, the network 140 may be a private network, a public network, an intranet, the Internet, or combinations thereof. The network 140 may provide to the MN 102 and/or the CN 104 upstream and/or downstream IP packets, such as IPv6 packets, that may comprise data, text, voice, video, and/or any other services. Alternatively, such packets may be exchanged between the MN 102 and the CN 104. The packets may be part of an IPv6 flow that may be identified by a source IP address, a destination IP address, a transport protocol number, a source port number, a destination port number, or combinations thereof.

Figure 2:
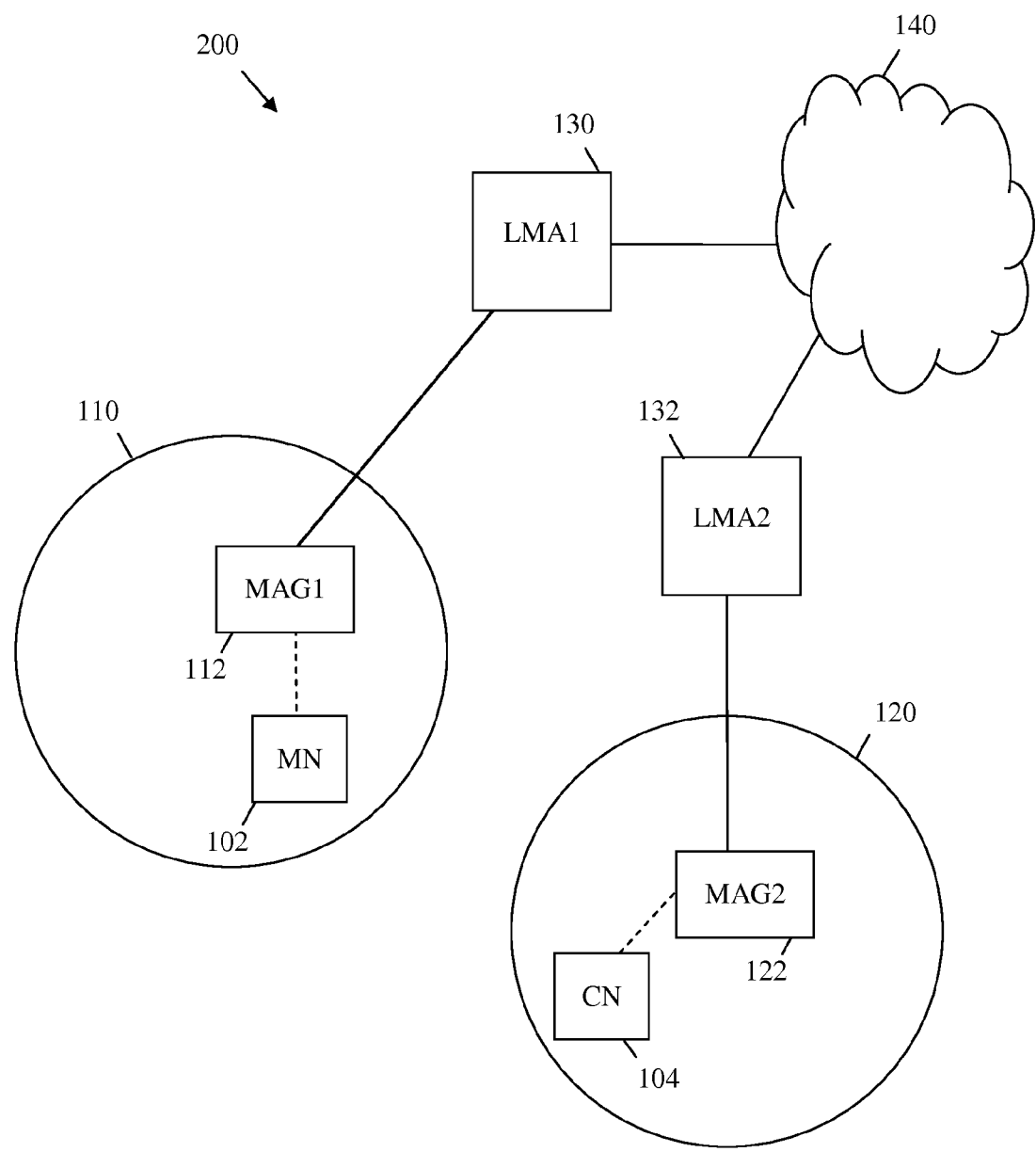
FIG. 2 is a schematic diagram of another embodiment of the wireless access network system.

FIG. 2 illustrates another embodiment of the wireless access network system 200, which may support route optimization in PMIPv6. The wireless access network system 200 may comprise a MN 102, a CN 104, a first MAG 112 (MAG1) in a first wireless access network 110, a second MAG 122 (MAG2) in a second access network 120, a LMA 130, and a network 140, all of which are substantially the same as described above. However, the wireless access network system 200 also comprises a second LMA 132 (LMA2) positioned between the second MAG 122 and the network 140. The second LMA 132 may be substantially similar to the first LMA 130, with the exception that the first LMA 130 may be the LMA for the MN 102, but not the CN 104, while the second LMA 132 may be the LMA for the CN 104, but not the MN 102. In addition, the first LMA 130 and the second LMA 132 may communicate directly with each other or via the network 140. It will be appreciated that FIGS. 1 and 2 illustrate only two embodiments of the wireless access network system, and that other embodiments of the wireless access network system may exist.

Figure 3:
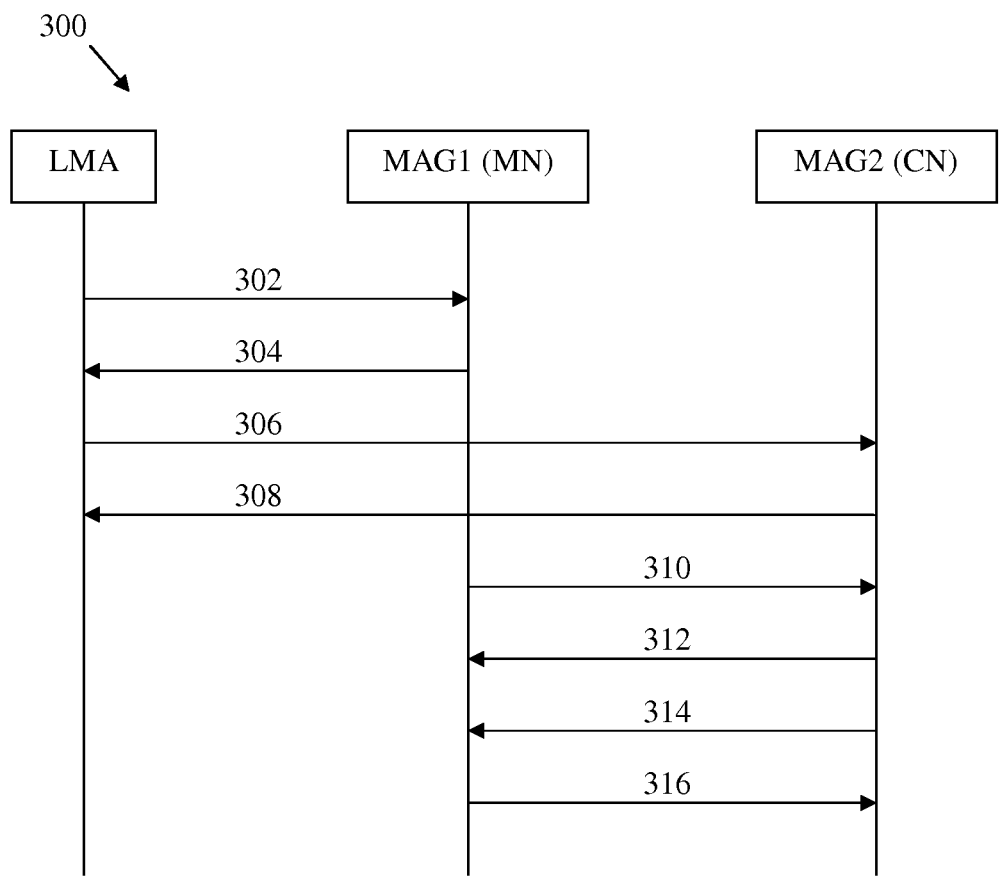
FIG. 3 is a protocol diagram of an embodiment of a route optimization method.

FIG. 3 illustrates an embodiment of a route optimization protocol 300 that may be implemented in a PMIPv6 setting. For example, the route optimization protocol 300 may be implemented for MN-CN communications where the MN's MAG and the CN's MAG are served by the same LMA, e.g. the situation shown in FIG. 1. The route optimization protocol 300 may be triggered at a LMA when a reverse tunneled packet is received from the MN's MAGs (e.g. the Proxy-care-of address (Proxy-CoA)1) and there is a binding cache entry (BCE) for the destination address of the packet pointing to the CN's MAG (e.g. Proxy-CoA2), or vice-versa.

The route optimization protocol 300 may start when the LMA sends a ROStartReq message 302 to the MN's MAG (MAG1), e.g. to the MN's Proxy-CoA1. The ROStartReq message 302 may comprise the MN's address and Proxy-CoA1, a lifetime for the route optimization, and a non-zero integer in the sequence number field. In an embodiment, the ROStartReq message 302 may comprise at least one pair of MN-CN RO Options described below. For each MN address listed in the (e.g. in each MN-CN RO Option pair), the MN's MAG may search its BUL for a matching IPv6 home network prefix in the list of prefixes it stores for each MN that MAG is serving. The MN's MAG may then respond to the ROStartReq message 302 with a ROStartRes message 304, which may indicate whether route optimization was accepted or rejected. Route optimization will generally be accepted unless there is a problem with the ROStartReq message 302. The ROStartRes message 304 may comprise the same sequence number as in ROStartReq message 302. If the ROStartRes message 304 is not received by the LMA, then it may retransmit the ROStartReq message 302, e.g. after a predetermined interval.

The LMA may also send a ROStartReq message 306 to the CN's MAG (MAG2), e.g. to the CN's Proxy-CoA2. The ROStartReq message 306 may comprise the CN's address and Proxy-CoA2, a lifetime for the route optimization, and may comprise a non-zero integer in the sequence number field. The sequence number in the ROStartReq message 306 may be a single increment from the sequence number in the ROStartReq message 302. In an embodiment, the ROStartReq message 306 may comprise at least one pair of MN-CN RO Options described below. For each CN address listed in the (e.g. in each MN-CN RO Option pair), the CN's MAG may search its BUL for a matching IPv6 home network prefix in the list of prefixes it stores for each CN that MAG is serving. The CN's MAG may then respond to the ROStartReq message 306 with a ROStartRes message 308, which may indicate whether route optimization was accepted or rejected. Again, route optimization will generally be accepted unless there is a problem with the ROStartReq message 306. The ROStartReq messages 302 and 306 may be sent in the order depicted in FIG. 3, in the reverse order, or at the same time. Similarly, ROStartRes messages 304 and 308 may be sent in the order depicted in FIG. 3, in the reverse order, or at the same time. Thus, the LMA may have a plurality of outstanding ROStartReq messages 302, 306 because they are sent to a plurality of MAGs prior to receiving the corresponding ROStartRes messages 304, 308.

The MN's MAG may then send a PBU message 310 to the CN's MAG. The PBU message 310 may register the MN's state with the CN's MAG, and may set a lifetime for the MN's binding at the CN's MAG, which may be the same as the lifetime value in the ROStartReq message 302. In addition, the destination address in the PBU message 310 may be the same as the Proxy CoA field in the CN part of MN-CN RO Option found in the ROStartReq message 302. The MN's MAG may send a separate PBU message 310 to the MAG for each CN when the ROStartReq message 302 contains a plurality of MN-CN RO Option pairs. The CN's MAG may respond to the PBU message 310 with a PBA message 312, which may indicate whether the binding was accepted or rejected.

The CN's MAG may also send a PBU message 314 to the MN's MAG. The PBU message 314 may register the CN's state with the MN's MAG, and may set a lifetime for the CN's binding at the MN's MAG, which may be the same as the lifetime value in the ROStartReq message 306. In addition, the destination address in the PBU message 310 may be the same as the Proxy CoA field in the MN part of MN-CN RO Option found in the ROStartReq message 306. The CN's MAG may send a separate PBU message 314 to the MAG for each MN when the ROStartReq message 302 contains a plurality of MN-CN RO Option pairs. The MN's MAG may respond to the PBU message 314 with a PBA message 316, which may indicate whether the binding was accepted or rejected. The PBU messages 310 and 314 may be sent in the order depicted in FIG. 3, in the reverse order, or at the same time. Similarly, PBA messages 312 and 316 may be sent in the order depicted in FIG. 3, in the reverse order, or at the same time. In addition, the PBU-PBA exchange may be repeated as necessary to extend the lifetime of the binding. After the PBU-PBA exchange is completed, the MN's MAG and the CN's MAG may send MN-CN traffic to each other, e.g. without routing such traffic through the LMA.

For each PBU message sent to a MAG (e.g. the MN's MAG or the CN's MAG), a new BUL entry may be created if it has not already been created before, e.g. if the PBU is not a refresh PBU. The new PBU entry may comprise MN information fields, such as MN-Identifier, link-layer identifier, home network prefixes, and so forth. These fields may be copied from the existing entry that was created with home (LMA) registration. The IPv6 address of the LMA serving the attached MN may be interpreted as a Proxy-CoA of the MAG PBU that was sent, and the Proxy-CoA field in CN part of MN-CN RO Option may be copied to this field. In addition, the new PBU entry may comprise an IP address of the node to which a Binding Update was sent field, as defined in IETF document RFC 3775, may be set to a home network prefix field of the CN part of MN-CN RO Option. If a P bit is set in the MN-CN RO Option, this field may be set to IPv4 home address (HoA) field of the CN part of MN-CN RO Option. Finally, the initial value of binding lifetime field may be set to the lifetime field of ROStartReq message.

When a handover occurs, the MN's registration entry in MAG1's BUL may be transferred to the new MAG. The new MAG may send a PBU to each MAG with which the MN's previous MAGs had established route optimization. The PBU-PBA exchange between the MN's new MAG and the CN's MAG re-establishes the optimal route path between the MN and the CN. After handover, if MN's new MAG is MAG2 (e.g. the CN's MAG), the PBU-PBA exchange is not necessary and can be omitted. Instead, route optimization between the MN and the CN may be conducted as described in IETF RFC 5213, e.g. with MN-CN communications traversing only one MAG and no LMAs.

The LMA may stop the route optimization protocol 300 at any time. To do so, the LMA may send to the MAGs a ROStartReq message 302 comprising a lifetime field set to about zero. The MAGs may respond with ROStartRes messages 304 comprising matching sequence numbers. After the LMA receives such ROStartRes messages 304, the route optimization protocol 300 may end, and the LMA-MAG tunnel may be re-established separately for each MAG.

IPv4 support may be needed when the MN is IPv4 enabled and receives an IPv4 HoA. In such a case, route optimization may be supported if both of the MN's IPv4 HoAs, e.g. the IPv4-MN-HoA and the IPv4 Proxy CoA, at the MAGs are global addresses. Initially, both the MN and the CN may configure their IPv4 HoAs via a PBU/PBA exchange with the LMA as explained in IETF document draft-ietf-netlmm-pmip6-ipv4-support, which is incorporated herein by reference as if reproduced in its entirety. In such a case, the LMA may include the IPv4-MN-HoA in the ROStartReq message for both the MN and the CN. If the MN or the CN is assigned a home network prefix, the LMA may also include the home network prefix in the PBU. The ROStartReq and ROStartRes messages may both be IPv6 messages and may be transported along the LMA-MAG tunnel used to transport the PBU and PBA messages. In addition, the PBU and PBA messages exchanged between the MAGs may be IPv6 messages and may be transported as unencapsulated IPv6 messages. When route optimization is established, data messages between the two MAGs may be transported as IPv4 payload using IPv6.

IPv4 support may also be needed when the transport network between the LMA and the MAG is an IPv4 network. In such a case, the ROStartReq, ROStartRes, PBU, and PBA messages may be transported as IPv6 messages using IPv4 or IPv4-user datagram protocol (UDP)-Encapsulating Security Payload (ESP) encapsulation as defined in IETF document draft-ietf-netlmm-pmip6-ipv4-support. The IPv4-UDP and IPv4-UDP-type-length-value (TLV) modes may not be used because the network address translation (NAT) boxes may not be supported by the present route optimization protocol. When route optimization is established, IPv4 data packets may be transported as IPv4 packets or encapsulated in IPv4-UDP-ESP encapsulation.

A configuration variable, specifically EnableLMALocalRouting, may be defined at the MAGs to indicate whether or not the MAGs are allowed to enable local routing between MAGs in the same localized network mobility domain. The configuration variable may indicate whether or not the MAGs are allowed to enable local routing of the traffic exchanged between a visiting MN that is locally connected to one of the interfaces of the MAG and a CN that is locally connected to one of the interfaces of another MAG that is connected to the same LMA. The configuration variable may initially be set to zero, but may be set to one when the MAG receives ROStartReq message with nonzero lifetime from the LMA.

Upon receiving a PBU message, the MAG may determine whether the configuration variable is set to one. If the configuration variable is not set to one, the MAG may reject the request and send a PBA message with the status field set to an indicator, such as 129, that may indicate that the route optimization is administratively prohibited. If the PBU message is accepted, the MAG may create a BCE, where the source address of the PBU may be copied to the Proxy CoA field of the BCE and/or the proxy registration flag may be set to one. The MN's data (MN-Identifier, link-layer identifier, link-local address, home network prefixes, etc.) may also be copied from the corresponding fields of the PBU to the BCE.

Upon completion of the PBU/PBA exchange, the MAGs may establish a bi-directional tunnel between each other. The tunnel endpoints may be the Proxy-CoA of the two MAGs. This tunnel should be torn down when there are no MNs sharing it or when MAG receives ROStartReq message from the LMA with lifetime set to zero. When using IPv4 transport, the endpoints of the bi-directional tunnel may be the IPv4-Proxy-CoAs of the two MAGs. The encapsulation mode may be the same as specified in IETF document draft-ietf-netlmm-pmip6-ipv4-support.

Upon receiving a packet from a MN connected to its access link and destined for a destination that is not directly connected, if the configuration variable is set to one, the MAG may search its binding cache for the IPv6 home network prefixes. If the destination address matches one of the home network prefixes, the packet may be forwarded to the Proxy CoA field in the BCE as a tunneled packet.

Figure 4:
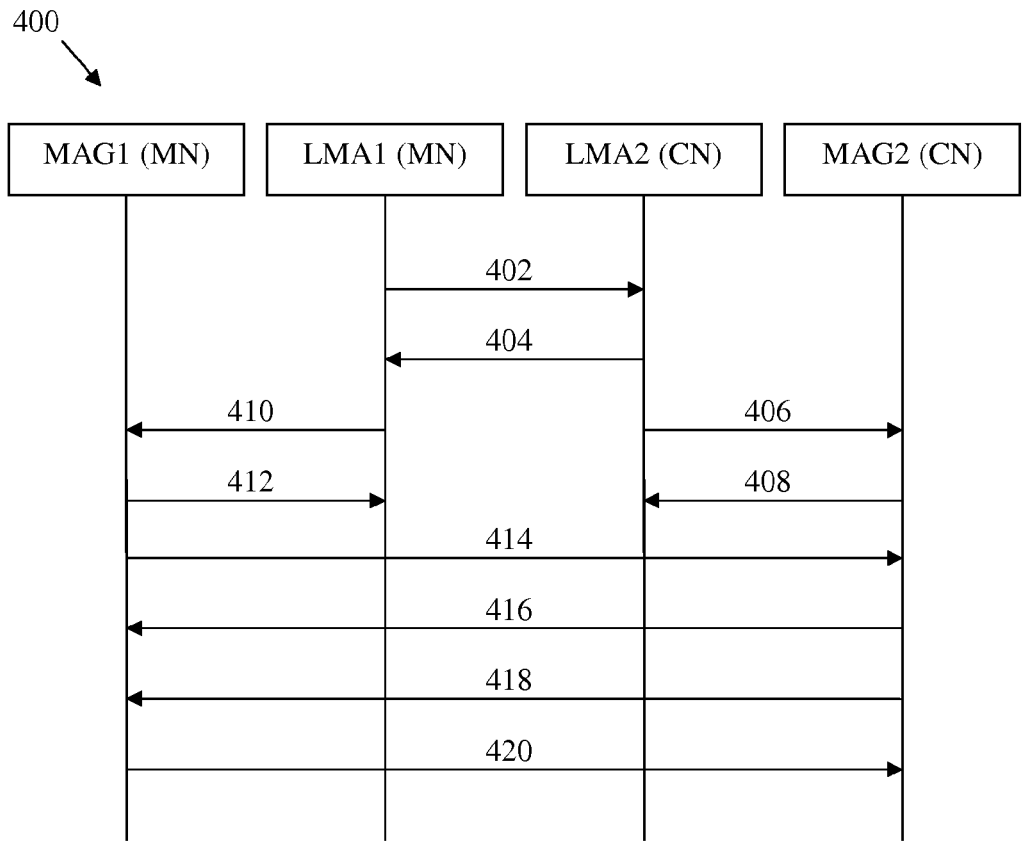
FIG. 4 is a protocol diagram of another embodiment of the route optimization method.

FIG. 4 illustrates another embodiment of the route optimization protocol 400 that may be implemented in a PMIPv6 setting. For example, the route optimization protocol 400 may be implemented for MN-CN communications where the MN's MAG and the CN's MAG are served by different LMAs, e.g. the situation shown in FIG. 2. The route optimization protocol 400 may be triggered at a LMA when one of the LMAs receives on its upstream interface a packet whose destination address is a MN for which the LMA has a BCE. From the BCE, the LMA may determine the MAG address, e.g. Proxy-CoA1, associated with the MN. The LMA may then check the source address to determine whether the packet is coming from a CN located in the same PMIPv6 domain. If so, the LMA may then determine the address for the CN's MAG, e.g. Proxy-CoA2. In one embodiment, LMAs within the same PMIPv6 domain may be configured with a table containing a list of prefixes (e.g. /48, /32, etc. prefixes) and the corresponding addresses for all the LMAs in the domain. In such a case, the LMA may search this table by doing a longest prefix match based on the prefix part of the CN's source address to determine the address of the CN's LMA. Alternatively, the LMA may consult an authentication, authorization, and accounting (AAA) server, e.g. a RADIUS or DIAMETER server, to determine the address of the CN's LMA. Specifically, the LMA may send the CN's address to the AAA server and ask for the address of the LMA and/or MAG to which the CN is attached. The LMA may also determine the address for the CN's MAG using any other acceptable method.

The route optimization protocol 400 may start when the MN's LMA (LMA1) sends a LMAROStartReq message 402 to the CN's LMA (LMA2). The LMAROStartReq message 402 may comprise the MN's address, the CN's address, the address for the MN's MAG (e.g. Proxy-CoA1), a lifetime for the route optimization, and a non-zero integer in the sequence number field. The initial sequence number may be incremented by one for the next LMAROStartReq message 402 sent. The MN's LMA will typically only have one outstanding LMAROStartReq message 402, but could have a plurality of outstanding LMAROStartReq messages 402 in the case of multiple concurrent route optimizations. In an embodiment, the LMAROStartReq message 402 may comprise at least one pair of the MN-CN RO Options described below, where MAG2's address may be set to zero.

If the LMAROStartReq message 402 comprises a non-zero lifetime value, the CN's LMA may update its binding cache and may search its binding cache for an entry for the CN to determine the address for the CN's MAG (e.g. Proxy-CoA2). If an entry is found, the CN's LMA may respond to the LMAROStartReq message 402 with a LMAROStartRes message 404, which may indicate whether route optimization was accepted or rejected. Route optimization will generally be accepted unless there is a problem with the LMAROStartReq message 402. The LMAROStartRes message 404 may comprise the MN's address, the CN's address, the address for the MN's MAG (e.g. Proxy-CoA1), the address for the CN's MAG (e.g. Proxy-CoA2), the lifetime of the route optimization, and the same sequence number as in LMAROStartReq message 402. If the LMAROStartRes message 404 is not received by the MN's LMA, then it may retransmit the LMAROStartReq message 402, e.g. after expiration of a predetermined interval. In addition, the CN's LMA may set the lifetime field in the LMAROStartRes message 404 to the same value as or a different value than that included in the LMAROStartReq message 402. If the lifetime value in the LMAROStartRes message 404 is different than the lifetime value included in the LMAROStartReq message 402, then the lifetime field in the LMAROStartRes 404 value may become the final value and may be the same value as is included in the ROStartReq messages 406 sent to the MAGs. In an embodiment, the LMAROStartRes message 404 may comprise at least one pair of the MN-CN RO Options described below.

The CN's LMA may also send a ROStartReq message 406 to the CN's MAG (MAG2), e.g. to Proxy-CoA2. The ROStartReq message 406 may comprise the MN's address, the CN's address, the address for the MN's MAG (e.g. Proxy-CoA1), the address for the CN's MAG (e.g. Proxy-CoA2), a lifetime of the route optimization, and a non-zero integer in the sequence number field. In an embodiment, the ROStartRes message 406 may comprise at least one pair of the MN-CN RO Options described below. For each CN address listed in the ROStartReq message 406 (e.g. in each MN-CN RO Option pair), the CN's MAG may search its BUL for a matching IPv6 home network prefix in the list of prefixes it stores for each CN that MAG is serving. The CN's MAG may then respond to the ROStartReq message 406 with a ROStartRes message 408, which may indicate whether route optimization was accepted or rejected. Route optimization will generally be accepted unless there is a problem with the ROStartReq message 406. The ROStartRes message 408 may comprise the same sequence number as in ROStartReq message 406. In an embodiment, the ROStartRes message 408 may comprise at least one pair of the MN-CN RO Options described below. If the ROStartRes message 408 is not received by the CN's LMA, then it may retransmit the ROStartReq message 406, e.g. after a predetermined interval.

Similarly, the MN's LMA may also send a ROStartReq message 410 to the MN's MAG (MAG1), e.g. to the MN's Proxy-CoA1. The ROStartReq message 410 may comprise the MN's address, the CN's address, the address for the MN's MAG (e.g. Proxy-CoA1), the address for the CN's MAG (e.g. Proxy-CoA2), a lifetime for the route optimization, and a non-zero integer in the sequence number field. In an embodiment, the ROStartReq message 410 may comprise at least one pair of the MN-CN RO Options described below. For each MN address listed in the ROStartReq message 410 (e.g. in each MN-CN RO Option pair), the MN's MAG may search its BUL for a matching IPv6 home network prefix in the list of prefixes it stores for each MN that MAG is serving. The MN's MAG may then respond to the ROStartReq message 410 with a ROStartRes message 412, which may indicate whether route optimization was accepted or rejected. Again, route optimization will generally be accepted unless there is a problem with the ROStartReq message 410. The ROStartRes message 412 may comprise the same sequence number as in ROStartReq message 410. If the ROStartRes message 412 is not received by the MN's LMA, then it may retransmit the ROStartReq message 406, e.g. after a predetermined interval. The ROStartReq messages 406, 410 may be sent at the same time as depicted in FIG. 4 or at different times. Similarly, ROStartRes messages 408, 412 may be sent at the same time as depicted in FIG. 4 or at different times.

The MN's MAG may then send a PBU message 414 to the CN's MAG. The PBU message 414 may register the MN's state with the CN's MAG, and may set a lifetime for the MN's binding at the CN's MAG, which may be the same as the lifetime value in the ROStartReq message 410. In addition, the destination address in the PBU message 414 may be the same as the Proxy CoA field in the CN part of MN-CN RO Option found in the ROStartReq message 410. The MN's MAG may send a separate PBU message 414 to the MAG for each CN when the ROStartReq message 410 contains a plurality of MN-CN RO Option pairs. The CN's MAG may respond to the PBU message 414 with a PBA message 416, which may indicate whether the binding was accepted or rejected.

The CN's MAG may also send a PBU message 418 to the MN's MAG. The PBU message 418 may register the CN's state with the MN's MAG, and may set a lifetime for the CN's binding at the MN's MAG, which may be the same as the lifetime value in the ROStartReq message 406. In addition, the destination address in the PBU message 418 may be the same as the Proxy CoA field in the MN part of MN-CN RO Option found in the ROStartReq message 406. The CN's MAG may send a separate PBU message 418 to the MAG for each MN when the ROStartReq message 406 contains a plurality of MN-CN RO Option pairs. The MN's MAG may respond to the PBU message 418 with a PBA message 420, which may indicate whether the binding was accepted or rejected. The PBU messages 414 and 418 may be sent in the order depicted in FIG. 4, in the reverse order, or at the same time. Similarly, PBA messages 416 and 420 may be sent in the order depicted in FIG. 4, in the reverse order, or at the same time. In addition, the PBU-PBA exchange may be repeated as necessary to extend the lifetime of the binding. After the PBU-PBA exchange is completed, the MN's MAG and the CN's MAG may send MN-CN traffic to each other, e.g. without routing such traffic through the LMA.

If the MAG cannot predictably detect the presence of the MN on the connected link, e.g. during handover or detachment, the MAG may terminate the MN's binding by sending a PBU message to all MAGs that have established bindings. In such a case, the PBU message may have its lifetime set to about zero, and the Proxy-CoA in the MAG field of each BUL entry may determine the MAG address. If IPv4 transport is used, the IPv4-Proxy-CoA may be used, and the MAG may also remove each BUL entry created for the MN. In order to re-establish the bindings of the MN involved in local routing, e.g. with BUL entries other than the home LMA registration, the previous MAG may use a context transfer procedure to transfer the local routing state to the next MAG. Each entry in the BUL for the MN, other than the LMA entry, can be transferred. After handover is complete, the next MAG may send PBU messages to each MAG (e.g. via the Proxy-CoA or IPv4-Proxy-CoA) for each CN.

Either LMA may stop the route optimization protocol 400 at any time. To do so, the LMA may send to the other LMA a LMAROStartReq message 402 comprising a lifetime field set to about zero. The other LMA may respond with a LMA-ROStartRes message 404 comprising a lifetime field set to about zero. Both LMAs may then send to their MAGs ROStartReq messages 406, 410 comprising lifetime fields set to about zero. The MAGs may respond with ROStartRes messages 408, 412 comprising matching sequence numbers. After the LMAs receive such ROStartRes messages 408, 412, the route optimization protocol 400 may end, and the LMA-MAG tunnels may be re-established separately for each LMA-MAG instance.

The IPv4 support for the route optimization protocol 300 may also be applicable for the route optimization protocol 400. In addition, the LMAROStartReq and LMAROStartRes messages may be IPv6 messages that are transported in IPv6 because the LMAs typically support IPv6 and there generally is IPv6 transport established among LMAs in the same PMIPv6 domain.

Figure 5:
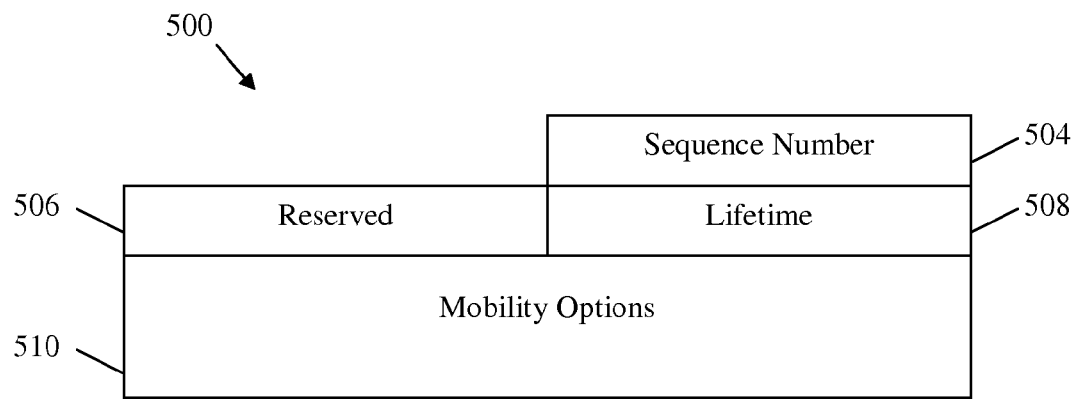
FIG. 5 is a schematic diagram of an embodiment of a ROStartReq message.

FIG. 5 illustrates an embodiment of the ROStartReq message 500. The ROStartReq message 500 may comprise a sequence number 504, a reserved field 506, a lifetime 508, and at least one mobility option 510, which may be arranged as shown in FIG. 5. The sequence number 504 may be an unsigned integer that is used by the LMA and/or MAGs to match the ROStartReq message 500 to an associated ROStartRes message. The MAGs may also use sequence number 504 to identify each new MN-CN pair, e.g. to start route optimization. The reserved field 506 may be unused and/or reserved for other purposes. As such, the reserved field 506 may be initialized to zero by the sender and ignored by the receiver. The lifetime 508 may be an unsigned integer that indicates an initial lifetime of the MN to CN route optimization binding when it is not equal to zero. If there are several MN-CN pairs, the same lifetime may be applied to each pair. The mobility option(s) 510 may comprise at least one MN-CN RO Option described below, and may also comprise any mobility options defined in section 6.1.7 of RFC 3775. In an embodiment, the sequence number 504, the reserved field 506, and the lifetime 508 may each be about 16 bits in length, and the mobility option(s) 510 may be an integer multiple of about 32 bits.

Figure 6:
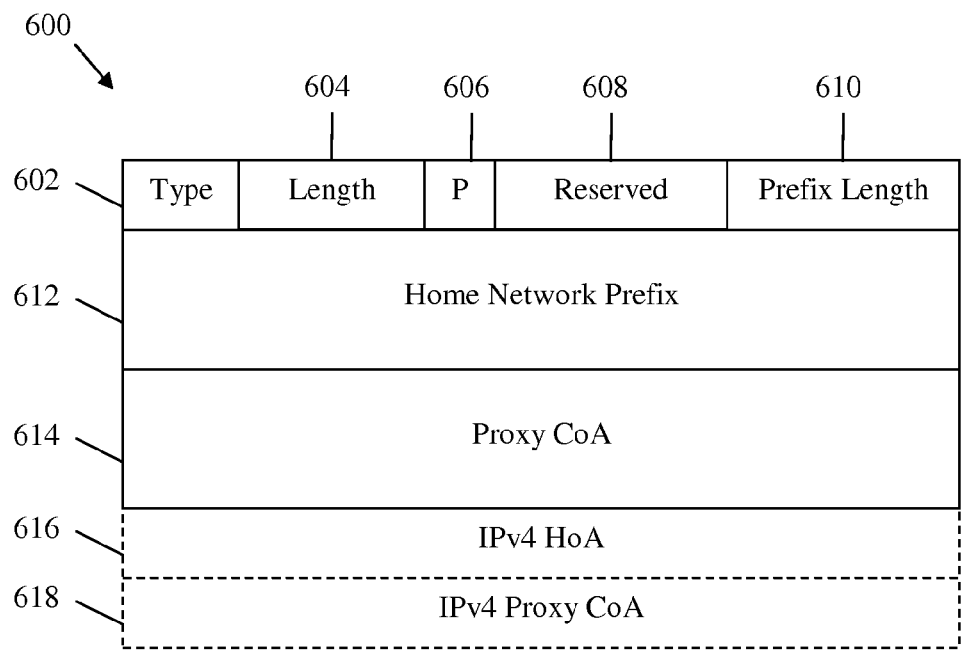
FIG. 6 is a schematic diagram of an embodiment of a MN-CN route optimization option.

FIG. 6 illustrates an embodiment of the MN-CN RO option 600. The MN-CN RO option 600 may be used with the ROStartReq and ROStartRes messages exchanged between the LMAs and MAGs and/or the LMAROStartReq and LMAROStartRes messages exchanged between the LMAs. The MN-CN RO option 600 may be used by the LMA(s) to enable local routing for the MN-CN path. The MN-CN RO option 600 may be used in pairs, wherein the first MN-CN RO option 600 may be for the MN and the second MN-CN RO option 600 may be for CN, or vice-versa. In addition, a plurality of MN-CN RO Options 600 can be included in the ROStartReq, ROStartRes, LMAROStartReq, and/or LMA-ROStartRes messages, for example when the MN is communicating with more than one CN. By doing so, the LMA may enable route optimization for a plurality of MN-CN pairs, wherein the lifetime set in the mobility header (MH) type applies to all MN-CN bindings included in the MN-CN RO option 600.

The MN-CN RO option 600 may comprise a type 602, a length 604, a P flag 606, a reserved field 608, a prefix length 610, a home network prefix 612, a proxy CoA 614, an optional IPv4 HoA 616, and an optional IPv4 Proxy CoA 618, which may be arranged as shown in FIG. 6. The reserved field 608 may be substantially the same as the reserved field 506 described above. The type 602 may be an integer assigned by the Internet Assigned Numbers Authority (IANA) that uniquely identifies the MN-CN RO option 600. The length 604 may be an unsigned integer that may indicate the length of the MN-CN RO option 600 in octets, excluding the type 602 and length 604. The P Flag 606 may be a flag that indicates whether IPv4 is supported. In an embodiment, when the P Flag 606 is set, the IPv4 HoA 616 and the IPv4 Proxy CoA 618 are included for the MN and/or the CN, as appropriate. The prefix length 610 may be an unsigned integer that indicates the length of the home network prefix 612.

The home network prefix 612 may comprise the MN's and/or CN's IPv6 home network prefix. For example, the home network prefix 612 in the MN's MN-CN RO option 600 may be set to the MN's home network prefix, and the home network prefix 612 in the CN's MN-CN RO option 600 may be set to the CN's home network prefix. The proxy CoA 614 may be the global address configured on the egress interface of the MAG to which the MN or CN is connected. For example, the proxy CoA 614 in the MN's MN-CN RO option 600 may be set to the MN's Proxy CoA (e.g. Proxy-CoA1), and the proxy CoA 614 in the CN's MN-CN RO option 600 may be set to zero. The IPv4 HoA 616 may be optional and may comprise the IPv4 HoA of the MN or CN. The IPv4 Proxy CoA 618 may be optional and may comprise the IPv4 address that is configured on the egress-interface of the MAG. In an embodiment, the type 602, the length 604, and the prefix length 610 may each have a length of about 8 bits, the P flag 606 may each have a length of about one bit, the reserved field 608 may have a length of about seven bits, the home network prefix 612 and the proxy CoA 614 may each have a length of about 128 bits, and the IPv4 HoA 616 and the optional IPv4 Proxy CoA 618, if present, may each have a length of about 32 bits.

Figure 7:
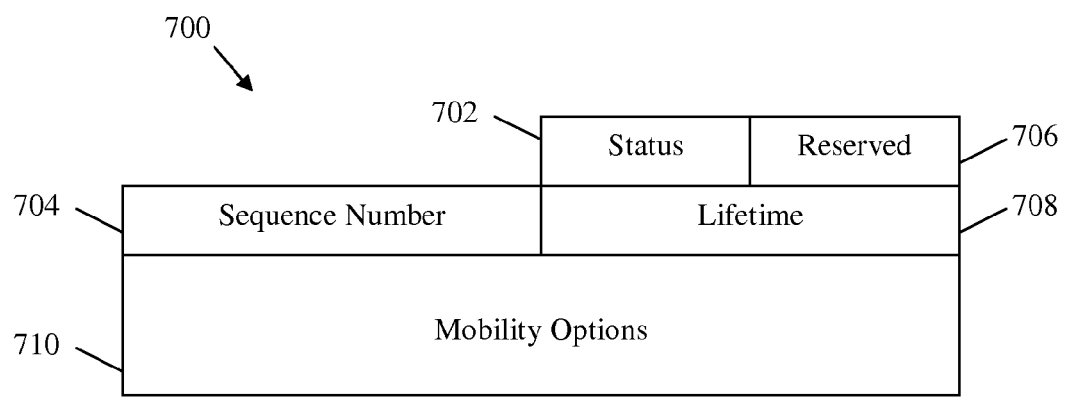
FIG. 7 is a schematic diagram of an embodiment of a route optimization start response (ROStartRes) message.

FIG. 7 illustrates an embodiment of the ROStartRes message 700. The ROStartRes message 700 may comprise a status 702, a sequence number 704, a reserved field 706, a lifetime 708, and at least one mobility option 710, which may be arranged as shown in FIG. 7. The sequence number 704, the reserved field 706, the lifetime 708, and the mobility option(s) 710 may be substantially the same as the sequence number 504, the reserved field 506, the lifetime 508, and the mobility option(s) 510, respectively. The status 702 may be an unsigned integer that indicates the disposition of the associated ROStartReq message sent by the MAG. For example, status 702 values less than or equal to about 128 may indicate that the associated ROStartReq message was accepted by the MAG, whereas status 702 values greater than about 128 may indicate that the associated ROStartReq message was rejected by the MAG. In an embodiment, the mobility option(s) 710 may comprise pairs of MN-CN RO Options as defined above. In addition, the MAG may copy the mobility option(s) 710 from the associated ROStartReq message when status field 702 contains a value that indicates success. In an embodiment, the status 702 and the reserved field 706 may each be about eight bits in length, the sequence number 704 and the lifetime 708 may each be about 16 bits in length, and the mobility option(s) 710 may be an integer multiple of about 32 bits.

Figure 8:
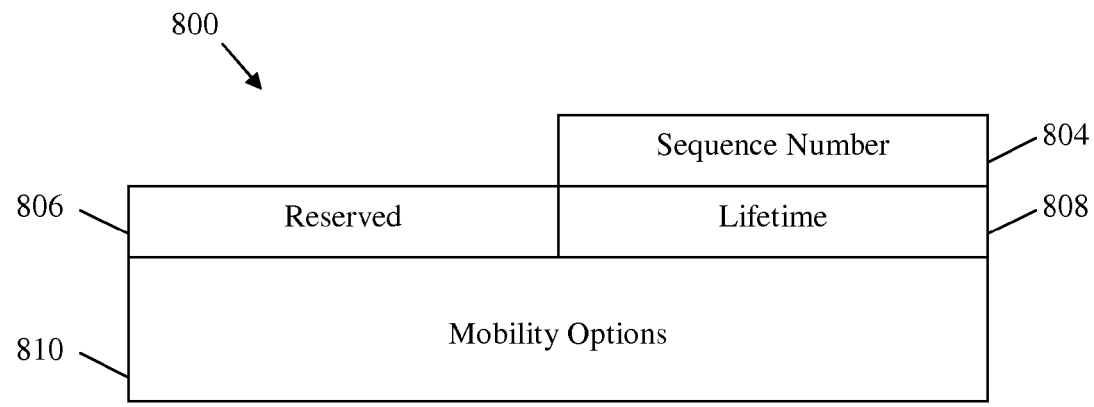
FIG. 8 is a schematic diagram of an embodiment of a LMA route optimization start request (LMAROStartReq) message.

FIG. 8 illustrates an embodiment of the LMAROStartReq message 800. The LMAROStartReq message 800 may comprise a sequence number 804, a reserved field 806, a lifetime 808, and at least one mobility option 810, which may be arranged as shown in FIG. 8. The reserved field 806, the lifetime 808, and the mobility option(s) 810 may be substantially the same as the reserved field 506, the lifetime 508, and the mobility option(s) 510, respectively. The sequence number 804 may be an unsigned integer that is used by the LMA and/or MAGs to match the LMAROStartReq message 800 to an associated LMAROStartRes message. The LMAs may also use sequence number 804 to identify each new MN-CN pair, e.g. to start route optimization. In an embodiment, the sequence number 804, the reserved field 806, and the lifetime 808 may each be about 16 bits in length, and the mobility option(s) 810 may be an integer multiple of about 32 bits.

Figure 9:
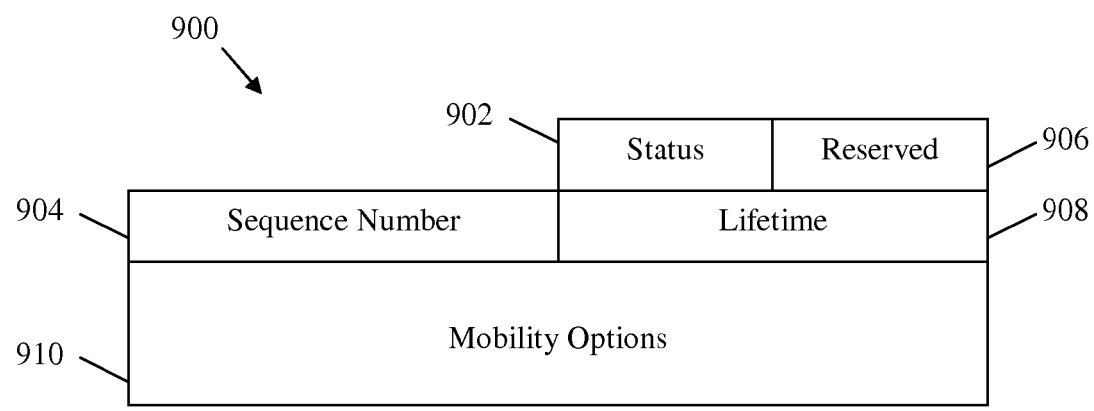
FIG. 9 is a schematic diagram of an embodiment of a LMA route optimization start response (LMAROStartRes) message.

FIG. 9 illustrates an embodiment of the LMAROStartRes message 900. The LMAROStartRes message 900 may comprise a status 902, a sequence number 904, a reserved field 906, a lifetime 908, and at least one mobility option 910, which may be arranged as shown in FIG. 9. The sequence number 904, the reserved field 906, the lifetime 908, and the mobility option(s) 910 may be substantially the same as the sequence number 504, the reserved field 506, the lifetime 508, and the mobility option(s) 510, respectively. The status 902 may be an unsigned integer that indicates the disposition of the associated LMAROStartReq message sent by the LMA. For example, status 902 values less than or equal to about 128 may indicate that the associated LMAROStartReq message was accepted by the LMA, whereas status 902 values greater than about 128 may indicate that the associated LMAROStartReq message was rejected by the LMA. In an embodiment, the mobility option(s) 910 may comprise pairs of MN-CN RO Options as defined above. In addition, the LMA may copy the mobility option(s) 910 from the associated LMAROStartReq message when status field 902 contains a value that indicates success. Furthermore, the LMA may search its binding cache for the CN's home network prefix value and find the corresponding MAG address, e.g.

Proxy-CoA2. The LMA may replace the MAG address field in the mobility option(s) 910, which may be set to zero, with the corresponding MAG address, e.g. Proxy-CoA2. In an embodiment, the status 902 and the reserved field 906 may each be about eight bits in length, the sequence number 904 and the lifetime 908 may each be about 16 bits in length, and the mobility option(s) 910 may be an integer multiple of about 32 bits.

Security mechanisms may be a point of concern in the route optimization process, especially for any system establishing a tunnel between two MAGs. If two MAGs are in the same localized mobility domain, then a trust relationship may be created between them, and such may be the case for the systems described herein. Moreover, such a relationship may simplify the structure of the PBU and PBA messages exchanged there between. Such a relationship also allows the PBU/PBA message exchange to be used for handling the soft-state for route optimization. In the case of the route optimization between two LMAs, at least some of the LMAs in the same PMIPv6 domain may establish a trust relationship between the LMAs. In addition, this trust relationship and security may extend to all of the MAGs in the same PMIPv6 domain.

Figure 10:
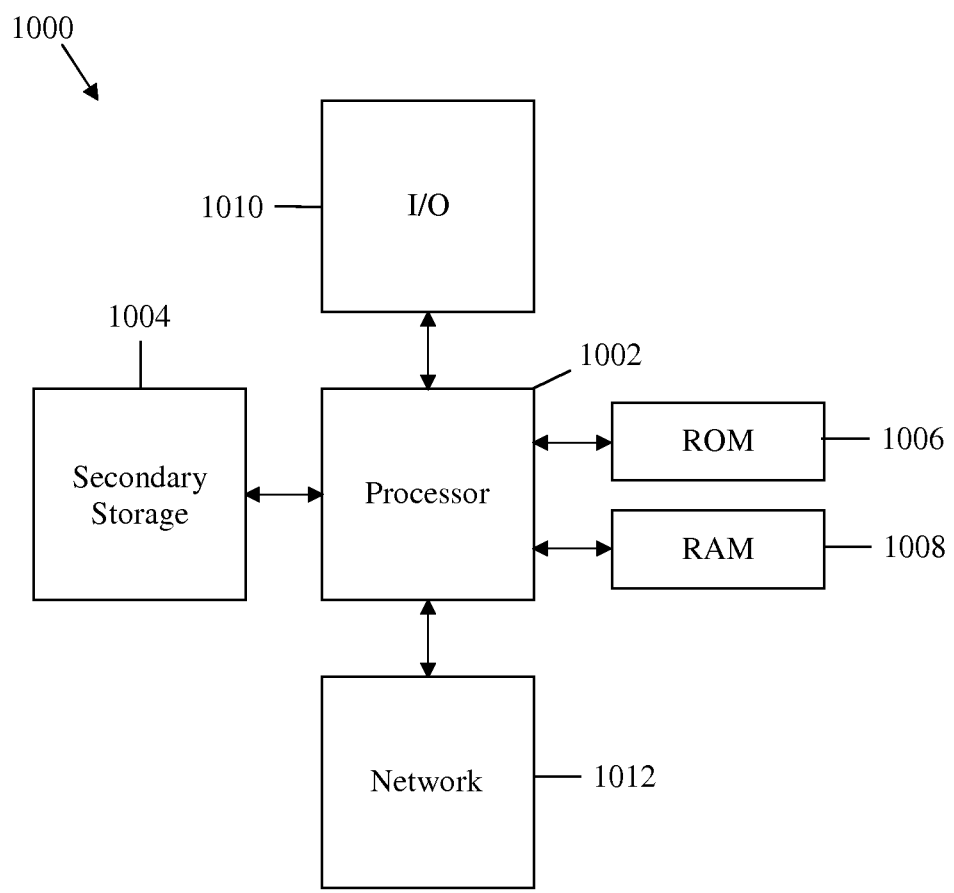
FIG. 10 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a first mobile access gateway (MAG) associated with a mobile node (MN) and configured to:
   receive a route optimization start request (ROStartReq) from a local mobility anchor (LMA), wherein the ROStartReq comprises a lifetime value; and
   in response to receiving the ROStartReq, send a proxy binding update (PBU) to a second MAG associated with a correspondent node (CN), wherein the PBU comprises the lifetime value of the ROStartReq and directs the second MAG to set a binding lifetime based on the lifetime value.

2. The apparatus of claim 1, wherein the first MAG is further configured to receive a proxy binding acknowledgement (PBA) from the second MAG, and wherein the PBU and the PBA register a state of the MN with the second MAG.

3. The apparatus of claim 2, wherein the first MAG is further configured to receive a second PBU from the second MAG and send a second PBA to the second MAG, and wherein the second PBU and the second PBA register a state of the CN with the first MAG.

4. The apparatus of claim 3, wherein the first MAG and the second MAG are configured to communicate with a local mobility anchor (LMA), and wherein the first MAG and the second MAG are configured to exchange a plurality of packets on behalf of the MN and CN without routing the packets through the LMA.

5. The apparatus of claim 4, wherein the packets are Internet Protocol (IP) version 6 (IPv6) packets.

6. The apparatus of claim 4, wherein the packets are Internet Protocol (IP) version 4 (IPv4) packets or encapsulated in IPv4-user datagram protocol (UDP)-Encapsulating Security Payload (ESP) encapsulation.

7. The apparatus of claim 3, wherein the first MAG is configured to communicate with a first local mobility anchor (LMA), wherein the second MAG is configured to communicate with a second LMA, wherein the first LMA is configured to communicate with the second LMA, and wherein the first MAG and the second MAG exchange a plurality of packets on behalf of the MN and CN without routing the packets through the first LMA or the second LMA.

8. The apparatus of claim 7, wherein the packets are Internet Protocol (IP) version 6 (IPv6) packets.

9. The apparatus of claim 7, wherein the packets are Internet Protocol (IP) version 4 (IPv4) packets or encapsulated in IPv4-user datagram protocol (UDP)-Encapsulating Security Payload (ESP) encapsulation.

10. The apparatus of claim 1, wherein the first MAG comprises a binding update list (BUL) entry for the second MAG, and wherein the second MAG comprises a second BUL entry for the first MAG.

11. An apparatus comprising:
a memory; and
at least one processor coupled to the memory and configured to:
promote transmission of a route optimization start request (ROStartReq) message to a first mobile access gateway (MAG),
wherein the ROStartReq message requests route optimization between a mobile node (MN) and a correspondent node (CN),
wherein the ROStartReq message comprises a lifetime value,
wherein the ROStartReq message requests a proxy binding update (PBU) message comprising the lifetime value be transmitted between the first MAG and a second MAG to create at least one binding with a lifetime based on the lifetime value,
wherein the ROStartReq message requests the creation of a route between the MN and the CN through the first MAG and the second MAG without passing through a local mobility anchor (LMA),
wherein the ROStartReq message comprises a MN-CN route optimization (RO) option, and
wherein the MN-CN RO option comprises a type, a length, a flag for Internet Protocol version 4 (IPv4) support, a prefix length, a home network prefix, and a proxy care-of address (CoA).

12. The apparatus of claim 11, wherein the MN-CN RO option further comprises an IPv4 home address and an IPv4 proxy CoA.

13. The apparatus of claim 11, wherein the processor is further configured to recognize reception of a route optimization start response (ROStartRes) message from the first MAG, wherein the ROStartRes message accepts or denies route optimization between the MN and the CN, and wherein the ROStartRes message comprises a second MN-CN RO option.

14. The apparatus of claim 13, wherein the processor is further configured to:
promote transmission of a second ROStartReq message to the second MAG; and
recognize reception of a second ROStartRes message from the second MAG,
wherein the second ROStartReq message requests route optimization between the MN and the CN,
wherein the second ROStartRes message accepts or denies route optimization between the MN and the CN,
wherein the second ROStartReq message comprises a third MN-CN RO option, and
wherein the second ROStartRes message comprises a fourth MN-CN RO option.

15. The apparatus of claim 13, wherein the processor is further configured to:
promote transmission of a local mobility anchor (LMA) ROStartReq (LMAROStartReq) message to a LMA; and
recognize reception of a LMA ROStartRes (LMAROStartRes) message from the LMA,
wherein the LMAROStartReq message requests route optimization between the MN and the CN,
wherein the LMAROStartRes message accepts or denies route optimization between the MN and the CN,
wherein the LMAROStartReq message comprises a third MN-CN RO option, and
wherein the LMAROStartRes message comprises a fourth MN-CN RO option.

16. The apparatus of claim 15, wherein all of the LMAs in a proxy mobile Internet Protocol version 6 (PMIPv6) domain are configured with a table comprising a plurality of /48 prefixes, a plurality of /32 prefixes, or both and a plurality of corresponding LMA addresses, and wherein the method further comprises: determining an address for the LMA by searching the table for a prefix part of a CN source address using a longest prefix match.

17. A system comprising:
a local mobility anchor (LMA);
a first mobile access gateway (MAG) coupled to the LMA and in communication with a mobile node (MN); and
a second MAG coupled to the LMA and in communication with a correspondent node (CN),
wherein the first MAG receives a route optimization request comprising a first lifetime value from the LMA and the second MAG receives a route optimization request comprising a second lifetime value from the LMA,
wherein the first MAG transmits a first proxy binding update (PBU) comprising the first lifetime value to the second MAG in response to the route optimization request and the second MAG transmits a second PBU comprising the second lifetime value to the first MAG in response to the route optimization request,
wherein the first PBU registers a state of the MN and a first binding lifetime, based on the first lifetime value from the LMA, with the second MAG,
wherein the second PBU registers a state of the CN and a second binding lifetime, based on the second lifetime value from the LMA, with the first MAG, and wherein communications between the MN and the CN are routed through the first MAG and the second MAG without being routed through the LMA.

18. The system of claim 17, wherein the first MAG maintains a binding update list (BUL) entry for the second MAG, and wherein the second MAG maintains a second BUL entry for the first MAG.

19. The system of claim 18, wherein the first MAG maintains a binding cache entry (BCE) for the CN, and wherein the second MAG maintains a second BCE entry for the MN.

20. The system of claim 19 further comprising:
a second LMA positioned between the second MAG and the LMA,
wherein communications between the MN and the CN are routed through the first MAG and the second MAG without being routed through the second LMA.

21. A network element comprising:
a local mobility anchor (LMA) configured to:
    initiate localized routing in response to a trigger;
    send plurality of route optimization request messages to a plurality of mobile access gateways (MAGs), wherein the route optimization request messages request a plurality of proxy binding update (PBU)/proxy binding acknowledgement (PBA) exchanges between the MAGs, and wherein each route optimization request message comprises a lifetime value to be transmitted in a corresponding PBU as a corresponding binding lifetime; and
    receive a route optimization response message from each MAG in response to the route optimization request messages,
    wherein subsequent packets are routed between the MAGs locally without traversing the LMA,
    wherein the route optimization request message comprises a mobility options field comprising a mobile node (MN) route optimization option, and
    wherein the MN route optimization option comprises a type, a length, an address length, and a MAG's internet protocol version six (IPv6) address.

22. The network element of claim 21, wherein at least one route optimization request message is encoded in a type length value (TLV), and wherein the route optimization request message further comprises:
a sequence number field comprising an integer used to match a route optimization response message to the route optimization request message; and
a lifetime field indicating the requested lifetime value for which the LMA wishes to have local forwarding.

23. The network element of claim 22, wherein the route optimization response message is encoded in a type length value (TLV), and wherein the route optimization response message comprises:
a sequence number field comprising an integer copied from the sequence number field of the route optimization request message to which the response is related;
a status field indicating whether an associated route optimization was a success;
a lifetime field indicating a lifetime value for which local forwarding is supported; and
a mobility options field comprising a MN route optimization option.

* * * * *

UNITED STATES PATENT AND TRADEMARK OFFICE
CERTIFICATE OF CORRECTION

| | | |
|---|---|---|
| PATENT NO. | : 8,599,843 B2 | Page 1 of 1 |
| APPLICATION NO. | : 12/711630 | |
| DATED | : December 3, 2013 | |
| INVENTOR(S) | : Behcet Sarikaya | |

It is certified that error appears in the above-identified patent and that said Letters Patent is hereby corrected as shown below:

In the Claims:

Column 17 Line 16-Column 18 Line 8 should read as follows:

21. A network element comprising:
  a local mobility anchor (LMA) configured to:
initiate localized routing in response to a trigger;
send a plurality of route optimization request messages to a plurality of mobile access gateways (MAGs), wherein the route optimization request messages request a plurality of proxy binding update(PBU)/proxy binding acknowledgement(PBA) exchanges between the MAGs, and wherein each route optimization request message comprises a lifetime value to be transmitted in a corresponding PBU as a corresponding binding lifetime; and
receive a route optimization response message from each MAG in response to the route optimization request messages,
wherein subsequent packets are routed between the MAGs locally without traversing the LMA,
wherein the route optimization request message comprises a mobility options field comprising a mobile node(MN) route optimization option, and
wherein the MN route optimization option comprises a type, a length, an address length, and a MAG's internet protocol version six (IPv6) address.

Signed and Sealed this
Twenty-fifth Day of March, 2014

Michelle K. Lee
*Deputy Director of the United States Patent and Trademark Office*